(12) United States Patent
Wong et al.

(10) Patent No.: US 10,937,446 B1
(45) Date of Patent: Mar. 2, 2021

(54) EMOTION RECOGNITION IN SPEECH CHATBOT JOB INTERVIEW SYSTEM

(71) Applicant: Lucas GC Limited, Hong Kong (HK)

(72) Inventors: Wang-Chan Wong, Irvine, CA (US); Howard Lee, Porter Ranch, CA (US)

(73) Assignee: Lucas GC Limited, Hong Kong (HK)

( * ) Notice: Subject to any disclaimer, the term of this patent is extended or adjusted under 35 U.S.C. 154(b) by 0 days.

(21) Appl. No.: 17/096,621

(22) Filed: Nov. 12, 2020

(30) Foreign Application Priority Data

Nov. 10, 2020 (CN) .......................... 202011243691.X (51) Int. Cl.
| | | |
|---|---|---|
| *G10L 15/00* | (2013.01) | |
| *G10L 15/04* | (2013.01) | |
| *G10L 25/63* | (2013.01) | |
| *G10L 15/22* | (2006.01) | |
| *G10L 15/16* | (2006.01) | |
| *G06N 3/08* | (2006.01) | |
| *G06N 3/04* | (2006.01) | |

(52) U.S. Cl.
CPC .............. *G10L 25/63* (2013.01); *G06N 3/049* (2013.01); *G06N 3/08* (2013.01); *G10L 15/16* (2013.01); *G10L 15/22* (2013.01); *G10L 2015/225* (2013.01); *G10L 2015/227* (2013.01)

(58) Field of Classification Search
None
See application file for complete search history.

(56) References Cited

U.S. PATENT DOCUMENTS

| | | | | |
|---|---|---|---|---|
| 8,831,999 | B2* | 9/2014 | Bolton | H04N 21/262 |
| | | | | 705/321 |
| 9,197,849 | B2* | 11/2015 | Bolton | G06Q 10/105 |
| 10,289,076 | B2* | 5/2019 | Kim | G06N 3/0445 |
| 2016/0150276 | A1* | 5/2016 | Bolton | H04N 21/44218 |
| | | | | 725/12 |
| 2018/0174020 | A1* | 6/2018 | Wu | G06N 3/08 |
| 2018/0192125 | A1* | 7/2018 | Bolton | H04N 7/141 |
| 2019/0057356 | A1* | 2/2019 | Larsen | G06K 9/00744 |
| 2020/0114521 | A1* | 4/2020 | Mahoor | B25J 9/1697 |
| 2020/0193095 | A1* | 6/2020 | Fan | G06N 3/0454 |

* cited by examiner

*Primary Examiner* — Satwant K Singh
(74) *Attorney, Agent, or Firm* — Helen Mao; Imperium Patent Works (57) ABSTRACT

Methods and systems are provided for speech emotion recognition interview process. In one novel aspect, in addition to contents assessment to an answer audio clip, the concurrent sentiment classifier is generated based on emotion classifier of the answer audio clip. In one embodiment, the computer system obtains a sentiment classifier of an audio clip of a first answer to the first question, wherein the sentiment classifier is derived from an emotion classifier resulting from a convolutional neural network (CNN) model analysis of the audio clip; obtains an assessment result to the first question by analyzing the audio clip of the first answer to the first question using a recurrent neural network (RNN) model; and generates a first emotion response result to the first question based on the sentiment classifier and the assessment result, wherein the first emotion response result presents a sampling experience factor to the response assessment result.

20 Claims, 6 Drawing Sheets

EMOTION RECOGNITION IN SPEECH CHATBOT JOB INTERVIEW SYSTEM

CROSS REFERENCE TO RELATED APPLICATIONS

This application claims priority under 35 U.S.C. § 119 from Chinese Application Number CN 202011243691.X titled "EMOTION RECOGNITION IN SPEECH CHATBOT JOB INTERVIEW SYSTEM" filed on Nov. 10, 2020. The disclosure of each of the foregoing documents is incorporated herein by reference.

TECHNICAL FIELD

The present invention relates generally to chatbot interview system and, more particularly, a speech emotion recognition in speech chatbot for the interview system.

BACKGROUND

The explosive growth of online community provides people with a wide range of benefits. The members of the online community share a wide variety of information through the social network platform. People rely on the social network, also known as the social media network, to get more connected and get information faster. In recent years, the social media network has extended beyond casual networking among friends and families. The social media platform has increasingly gained applications for business and professional uses. Many organizations and business units have their social media presences. Social media marketing has gained great momentum. The rapid and vast adoption of the social media technologies by business and professionals has changed how business finds partners, how people access information, and how people keep up with the latest development in their professional arena. In one notable area, the social media has been increasingly viewed as a professional platform to help businesses and job seekers connected. Business with job openings posts their job descriptions on the social media network. The job seekers or professionals post their resume and interests on the social media network. The social media network provides users to connect with each other and participate in groups. The online community has played a more important in recruiting procedures. From online job posting to resume submission, the traditional recruiting procedure has been improved and reached out to more talent more efficiently with the social media network. The process of interview for the recruitment, however, still heavily relies on human interaction. Online written test and speech chatbot applications are available to provide help to the interview process. Such technologies, however, do not provide emotional reaction information. The emotional reaction to the question is a valuable piece of information to provide a more comprehensive background of the candidate.

Improvements and enhancement to use a more efficient way for recruitment using social media are needed.

SUMMARY

Methods and systems are provided for speech emotion recognition interview process. In one novel aspect, in addition to contents assessment to an answer audio clip, the concurrent sentiment classifier is generated based on emotion classifier of the answer audio clip. In one embodiment, the computer system selects a first question from a question bank based on one or more selection criteria; obtains a sentiment classifier of an audio clip of a first answer to the first question, wherein the sentiment classifier is derived from an emotion classifier resulting from a convolutional neural network (CNN) model analysis of the audio clip; obtains an assessment result to the first question by analyzing the audio clip of the first answer to the first question using a recurrent neural network (RNN) model; and generates a first emotion response result to the first question based on the sentiment classifier and the assessment result, wherein the first emotion response result presents a sampling experience factor to the response assessment result. In one embodiment, the emotion classifier is one selecting from an emotion group comprising angry emotion, excited emotion, frustrated emotion, happy emotion, neutral emotion, sad emotion, and surprised emotion, and the sentiment classifier is one selecting from a sentiment group comprising extremely positive, positive, neutral, negative, extremely negative, and surprised. In another embodiment, the sentiment classifier is mapped to the emotion classifier. In one embodiment, the first question is a personal trait question, wherein the first answer to the personal trait question identifies one or more personal traits. In another embodiment, the assessment result of the personal trait question reveals a positive or a negative propensity on a scaling basis to the one or more personal traits identified by the first question. In yet another embodiment, the sentiment classifier alters the assessment result when the sentiment classifier indicates a positive, an extremely positive, a negative or an extremely negative result. In one embodiment, the first question is a technical question, wherein the first answer to technical question identifies one or more technical skills on a scaling basis. In another embodiment, the sentiment classifier serves as a reference factor to the assessment result, wherein the assessment result for the first question is correct when the sentiment classifier indicates an extremely negative, a negative, or a neutral result, the emotion response result for the first question indicates the first question is a below-skill-level question. In yet another embodiment, the computer system selects a second question from the question bank, wherein a selection criterion is based on the first emotion response result and presents the first question with a speech chatbot. The tone of voice of the speech chatbot is adjustable based on one or more dynamically configured adjustment factors. In one embodiment, the computer system selects a second question from the question bank, wherein one adjustment factor is the first emotion response result.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
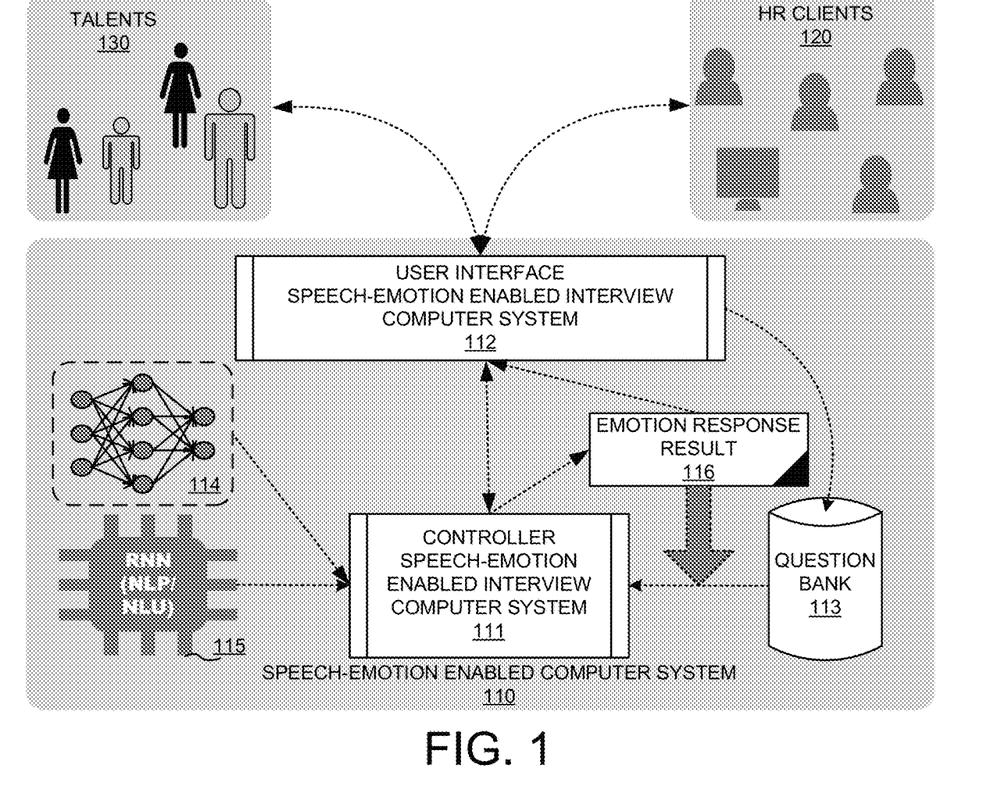
FIG. 1 illustrates exemplary diagrams for speech emotion recognition interview system in accordance with embodiments of the current invention.

FIG. 1 illustrates exemplary diagrams for speech emotion recognition interview system in accordance with embodiments of the current invention. An exemplary recruitment system includes speech emotion enabled computer system 110, a subsystem of human resource (HR) clients 120, a subsystem of talents 130. HR client subsystem 120 generates job descriptions and gets an interview report from speech emotion enabled computer system 110. Client 130 takes interview via speech emotion enabled computer system 110. The assessment to the answers together with the concurrent emotion response are generated by the computer system 110. The results are sent back to the HR client 120. The speech emotion recognition results generated by computer system 110 avoids possible biases occurred during a face-to-face or online video interview. On the other hand, computer system 110 generates concurrent emotion response reports, which can be used to assess the applicant's emotional intelligence. The emotion response can be used as a feedback in real time to select follow up questions. It is more interactive than the online written test.

Speech emotion enabled computer system 110 includes a controller 111, a user interface 112, a question bank 113, an emotion response result handler 116. Controller 111 interacts with an artificial intelligence (AI) program 115 of a recurrent neural network (RNN) for natural language processing (NPL)/natural language understanding (NLU). A convolutional neural network (CNN) long short-term memory (LSTM) unit 114 provides the controller the input of the speech emotion analysis to be used to generate the speech emotion result. In one embodiment, speech emotion enabled computer system 110 is a multi-process device. In other embodiments, computer system 110 runs on a plurality of devices.

User interface 112 exchanges information with external entities such as HR client 120 and talent 130. User interface 112 also interacts with other entities, such as network entities through network connections. User interface 112 receives job descriptions HR client 120. The job description identifies the skills desired. In one embodiment, the job descriptions are in free form from the HR client 120. In another embodiment, HR client 120 formatted job description forms to generate the job descriptions. User interface 112 sends the job description to controller 111 to generate interview questions. User interface 112 receives interview results from controller 111 and sends the results to HR client 120. User interface 112 also interacts with talent 130 to present the interview questions to talent 130 and receives audio responses from talent 130. User interface 112 sends the received audio response to controller 111. Speech emotion enabled computer system controller 111 receives user inputs from user interface 112. Upon receiving the job description, controller 111 prepares a set of interview questions based on the job description, predefined rules, and question bank 113.

Question bank 113 stores a plurality of interview questions. The interview questions are categorized based on predefined rules. For example, each question may include attributes to identify the category, subcategory, skill level, related area, and optionally follow up question index. The attributes of the interview questions in question bank 113 are used to associate with requirements from the job description and the rules/criteria. In one embodiment, question bank 113 receives information from user interface 112 and updates the interview questions based on the received information. The question bank update information includes one or more updates including updated questions, updated attributes of the question, such as a category, a subcategory of the question, updated rules for question selection, and other interview question related information. In one embodiment, new questions are added through the user interface. The question update information comes from one or more sources, including client 120, talent 130, and other resources. Controller 111 obtains interview questions from the question bank based on the job descriptions and one or more selection rules.

Controller 111 interacts with user interface 112, question bank 113, CNN LSTM 114, RNN (NLP/NLU) 115 to generate emotion response result 116. In one embodiment, controller 111 is a multi-processor controller. In other embodiments, controller 111 runs on one or more devices. Controller 111 receives job descriptions from user interface 112 and generates interview questions. In one embodiment, an analysis is performed on the received job description and one or more interview question selection rules are generated. In one embodiment, a set of interview questions is prepared by getting a subset of questions from question bank 113. The subset of the questions is selected from question bank 113 based on one or more rules, such as industry match and skill level match. Upon generating the set of interview questions, controller 111 arranges user interface 112 to conduct the interview with client 130. In one embodiment, the subset of interview questions selected from question bank 113 is dynamically updated based on the answer received. User interface 112 sends the answer audio in response to a question to controller 111. Controller 111 analysis the answer audio and generates an emotion response result 116. In one embodiment, controller 111 uses RNN(NLP/NLU) model 115 to analyze the speech audio from talent 130 and generates an assessment result, which is an assessment to the correctness of the answer to the question. Controller 111 also generates a sentiment classifier based on an emotion classifier, which is generated based on the same answer audio to the question. In one embodiment, the speech emotion classifier is generated using the CNN LSTM model. The generated emotion classifier is mapped to the sentiment classifier to generate emotion response result 116. Controller 111 sends emotion response result 116 to user interface 112.

Emotion response result 116 is generated based on the sentiment classifier and the assessment result of the answer audio clip. It provides a combination of the assessment result of the correctness of the answer to the question as well as a concurrent sentiment classifier of the same audio, which provides additional information to the assessment result. In one embodiment, emotion response result 116 is fed back to controller 111 to dynamically select the follow-up questions. Emotion response result 116 is sent to HR client 120 for a comprehensive report on the interview result.

Figure 2:
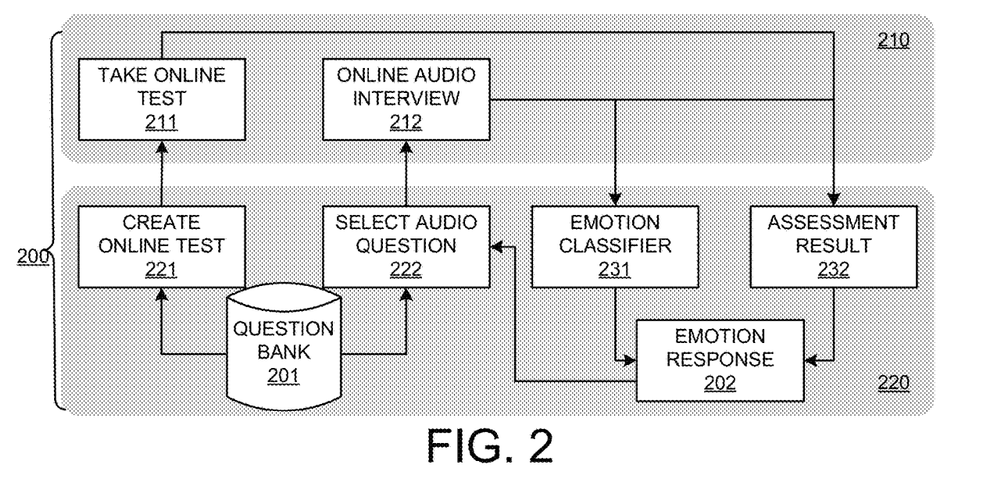
FIG. 2 illustrates exemplary module diagrams of a speech emotion enabled computer system with processing modules for the control subsystem and the talent subsystem in accordance with embodiments of the current invention.

FIG. 2 illustrates exemplary module diagrams of a speech emotion enabled computer system 200 with processing modules for the control subsystem and the talent subsystem in accordance with embodiments of the current invention. Speech emotion enabled computer system 200 includes a talent subsystem 210 and a computer system 220. Talent subsystem 210 includes take online test module 211 and online audio interview module 212. Control subsystem 220 includes create online test module 221, select audio question module 222, emotion classifier 231, assessment result module 232, question bank 201, and emotion response module 202. The talent can take online written test 211, which is analyzed by assessment 232 of control subsystem 220. Talent subsystem 210 also takes online audio interview 212 through a humanized speech chatbot. In one embodiment, the speech chatbot is further customized based on information of the interviewee and the feedback from the emotion response result from prior answers. For example, the voice tune is adjusted based on settings, including easygoing, challenging, and others. The audio clip of the online audio interview 212 is analyzed by both the assessment result module 232 and the emotion classifier 231. Question bank 201 stores and updates a whole set of interview questions. In one embodiment, each interview question in question bank 201 includes one or more attributes. Module 221 creates an online test based on a job description and one or more criteria by selecting a subset of questions from question bank 201. The created interview question is sent to talent subsystem 220. Select audio question module 222 selects one or more interview questions from question bank 201 for the audio interview. In one embodiment, select audio question module 222 selects a subset of interview questions from question bank 201. Select audio question module 222 selects interview questions based on the job description for the interview, one or more selection rules, and the attributes of each question in question bank 201. In one embodiment, the question selected may be presented to talent subsystem 220 in audio, written, or other formats. The interview questions selected by module 222 is answered by the talent in audio format. In one embodiment, control subsystem 220 receives audio clips of the answer to the question and analyzes the received audio clip with both emotion classifier 231 and assessment result module 232.

Assessment result module 232 generates contents evaluation of the answer audio clips. Emotion classifier 231 generates a sentiment classifier based on an emotion classifier 231. Emotion response 202 correlates the assessment result and the emotion classifier and generates an emotion response result. In one embodiment, the emotion response result, which also includes the assessment and the sentiment classifier, is fed back to select audio question module 222. In one embodiment, the audio interview question is dynamically selected, which is further based on prior emotion response results.

In one novel aspect, speech emotion response is generated by the computer system. In a traditional face-to-face or online video interview, the emotion response is observed by the interviewer and may be used to generate a more comprehensive result. However, face-to-face or video emotion recognition by the interviewer are highly subjective and varies with the interviewer. Speech emotion response generated by the computer system combines the assessment result of the answer's contents with the sentiment classifier generated by the computer system indicating the concurrent emotional reactions. The combined results provide a more comprehensive result than the current online test result and a more objective interpretation of the emotional reaction. The sentiment classifier is based on a computer-generated speech emotion classifier using speech recognition technology.

Figure 3:
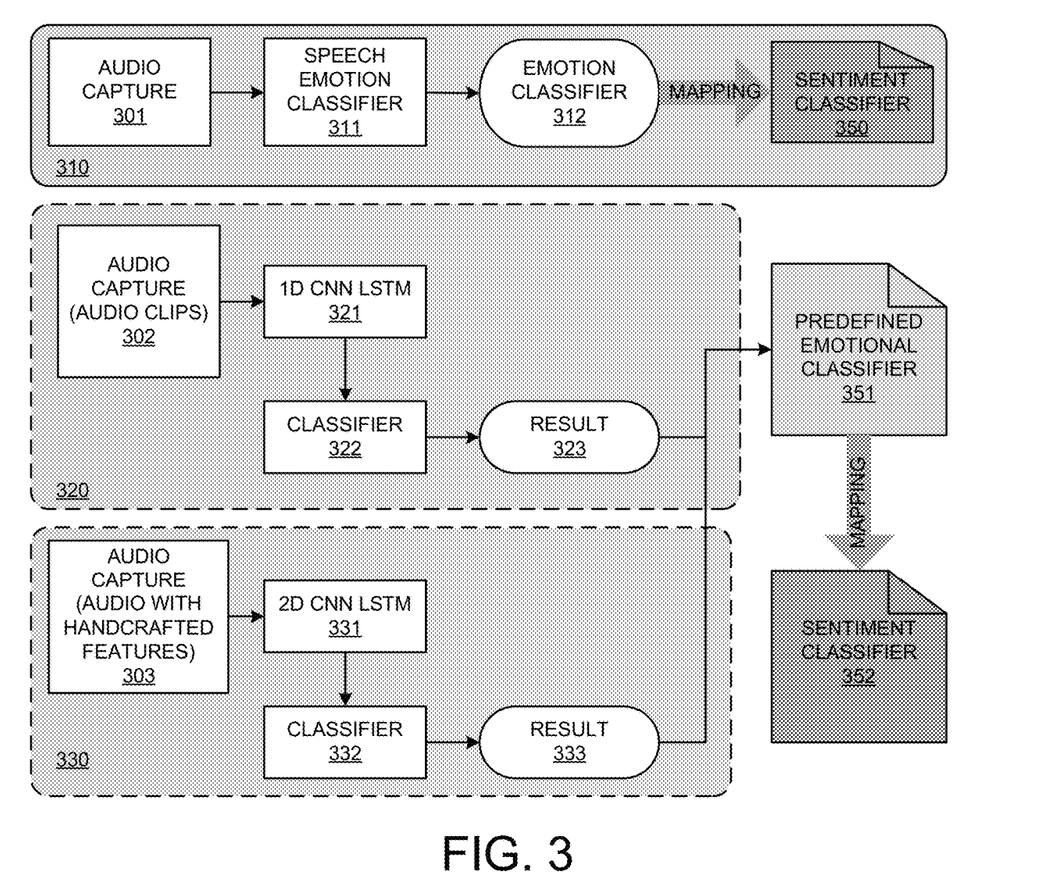
FIG. 3 illustrates exemplary diagrams for speech sentiment classifier generation based on answer audio clip in accordance with embodiments of the current invention.

FIG. 3 illustrates exemplary diagrams for speech sentiment classifier generation based on answer audio clip in accordance with embodiments of the current invention. In one novel aspect, in addition to contents assessment to an answer audio clip, the concurrent sentiment classifier is generated based on emotion classifier of the answer audio clip. In general, a sentiment classifier generation 300 includes the audio capturing system 301, speech emotion classifier processing 311, resulting emotion classifier 312 and the resulting sentiment classifier 350.

Audio capturing system 301 receives an answer audio stream and matches the audio clip to an interview question. The audio capturing system 301 sends the identified answer audio clip to speech emotion classifier processing 311. Speech emotion classifier processing 311 uses a speech emotion recognition procedure to identify an emotion classifier for the answer audio clip. The speech emotion recognition is based on a machine learning model that takes two steps. The first step is feature extraction. The second step is model building. Feature extraction has different approaches. One approach is to detect significant features directly from raw sound samples. The other approach uses only one specific feature of a sound file as input to the learning model. The latter approach is essentially a supervised machine learning model that uses a handcrafted feature sound file. The supervised learning model yields better accuracy. However, it is more expensive, and it requires expert or professional knowledge. Once features are extracted, a classifier model can be developed, trained, assessed, and fine-tuned. Many data mining models have been proposed, including the Support Vector Machine (SVM), Logistic Regressions, Hidden Markovian Model, and Neural Networks, such as a convolutional neural network (CNN) and a deep neural network (DNN). There are different emotion classifiers based on different models used. Once emotion classifier 312 is generated for the corresponding answer audio clip, the sentiment classifier 350 is generated. In one embodiment, a direct mapping is used to map each to a set of predefined sentiment classifiers based on predefined rules.

In one embodiment, a 1-dimensional (1D) CNN LSTM 320 is used to generate the emotion classifier. Audio clip file 302 is captured for the corresponding question. 1D CNN LSTM 321 processes the audio clip. 1D CNN LSTM recognizes speech emotion from raw data of audio clips. The processed data is sent to classifier 322 to generate emotion classifier result processor 323. Result processing 323 generates predefined emotion classifier for the audio clip. The generated emotion classifier 351 is mapped to sentiment classifier 352.

In another embodiment, a 2-dimensional (2D) CNN LSTM 330 is used to generate the emotion classifier. Audio clip 303 is produced for the corresponding question. 2D CNN LSTM 331 processes the audio clip. 2D CNN LSTM works on learning global contextual information from the handcrafted features. The processed data is sent to classifier 332 to generate emotion classifier result processor 333. Result processing 333 generates a predefined emotion classifier for the audio clip. The generated emotion classifier 351 is mapped to sentiment classifier 352.

Different speech emotion recognition methods may be used to obtain the speech emotion classifier from the answer audio clip. In one embodiment, the speech emotion classifiers are used to generate the sentiment classifier, which correlates with the assessment result of the audio clip.

Figure 4:
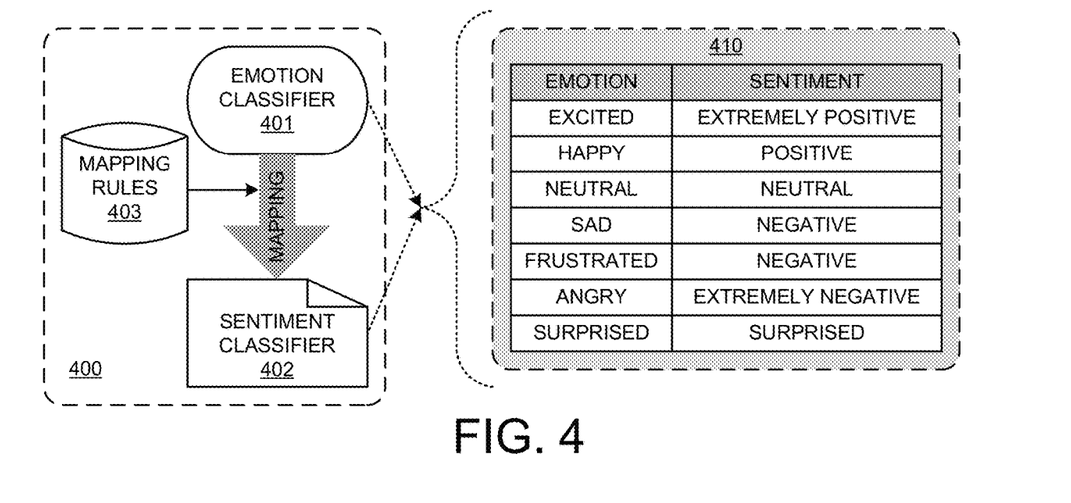
FIG. 4 illustrates exemplary diagrams for obtaining the sentiment classifier for an audio clip based on the emotion classifier of the audio clip using direct mapping in accordance with embodiments of the current invention.

FIG. 4 illustrates exemplary diagrams for obtaining the sentiment classifier for an audio clip based on the emotion classifier of the audio clip using direct mapping in accordance with embodiments of the current invention. A sentiment classifier generator 400 includes a mapping rule 403, an emotion classifier 401, and a sentiment classifier 402. Emotion classifier 401 is obtained for an audio clip using a speech recognition method, such as the 1D CNN LSTM and the 2D CNN LSTM. In one embodiment, seven different emotion classifiers are defined to identify the emotion result of the audio clip. Column-1 of table 410 shows an example of seven emotion classifiers, including excited, happy, neutral, sad, frustrated, angry, and surprised. In one embodiment, a mapping of each emotion classifier to a sentiment classifier is used. The mapping rule 403 is used for the mapping procedure. Table 410 illustrates an exemplary mapping of the seven emotion classifiers to corresponding sentiment classifiers. The sentiment classifier is used together with its corresponding assessment result of the same audio clip. Mapping rule 403 is predefined or preconfigured. Mapping rule 403 can be dynamically changed as well. An example of the mapping is shown in Table 410. For instance, emotion classifier "excited" is mapped to sentiment classifier "extremely positive." Similarly, "happy" is mapped to "positive," "neutral" is mapped to "neutral," "sad" is mapped to "negative," "frustrated" is mapped to "negative," "angry" is mapped to "extremely negative," and "surprised" is mapped to "surprised."

In one novel aspect, sentiment classifiers are combined with assessment result to an answer audio clip. The sentiment classifier of an audio clip is used in two areas. The first is assessing the personality traits by measuring the emotion the applicant exhibits when he answers personality trait questions. The second is correlating the emotion when the applicant answers the technical questions to the answer correctness.

Figure 5:
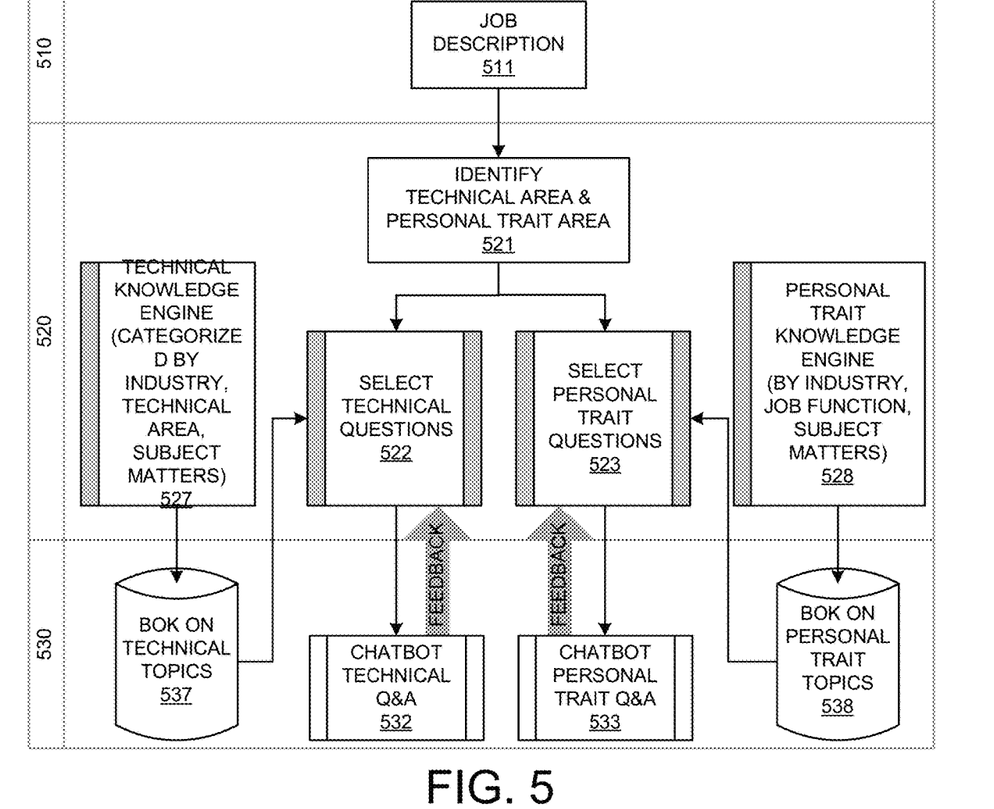
FIG. 5 illustrates exemplary diagrams for sentiment classifier for technical questions and personal trait question in accordance with embodiments of the current invention.

FIG. 5 illustrates exemplary diagrams for sentiment classifiers for technical questions and personal trait questions in accordance with embodiments of the current invention. A computer system includes an HR client subsystem 510, a controller subsystem 520, a knowledge base subsystem 530. HR client subsystem 510 includes a job description module 511. Job description module 511 creates job descriptions with both functional and non-function requirements. Functional requirements include technical requirements such as proficiency in one or more programming languages, asset management, humane resource, science research, digital marketing, and other. Different industries and different jobs have different requirements. Non-functional requirements are soft skills and personality traits, such as being a team player, communication skills, leadership skills, visionary, etc. Different industry, different job and different job titles may focus on different non-functional skills. In one embodiment, HR client 510 generates job descriptions using formatted forms and lists job requirements containing both functional and non-functional skills. In another embodiment, a general job description together with relevant information, such as the industry of the business and the job title, are used to generate a formatted job description.

Controller subsystem 520 includes identifier 521, technical question selector 522, personal trait question selector 523, technical knowledge engine 527, and personal trait knowledge engine 528. Identifier 521 receives job descriptions from job description module 511. Identifier 522 identifies one or more requirements for technical skills and personal skills. Body of knowledge (BOK) subsystem 530 includes body of knowledge (BOK) on technical topics 537 and body of knowledge (BOK) on personal trait topics 538. Technical knowledge engine 527 updates BOK on technical topics 537 based on triggering events, such as new updates from HR clients, new updates based on new technology, new updates based on market and/or technical research done by AI analysis system. Similarly, personal trait knowledge engine 528 updates BOK on personal trait topics 538 based on triggering events. Technical question selector 522 selects one or more technical questions from BOK on technical topics 537 based on inputs from identifier 521. Personal trait question selector 523 selects one or more personal trait questions from BOK on personal trait topics 538 based on inputs from identifier 521. The selected technical questions and personal trait questions are sent to technical speech chatbot unit 532 and personal trait speech chatbot unit 533, respectively. In other embodiments, the selected questions can be presented to other interfaces with the talent to collect audio answers. In one embodiment, technical question selector 522 and personal trait question selector 523 receive feedbacks based on the answer received from speech chatbot 532 and 533, respectively. In one embodiment, the answer feedbacks are used to select follow up questions dynamically.

Figure 6:
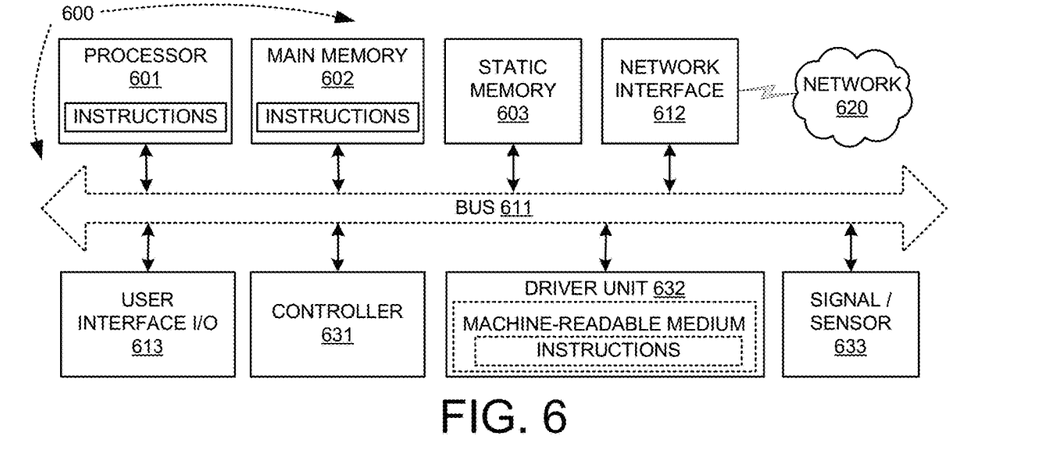
FIG. 6 illustrates an exemplary block diagram of a machine in the form of a computer system performing the speech emotion recognition for audio interviews in accordance with embodiments of the current invention.

FIG. 6 illustrates an exemplary block diagram of a machine in the form of a computer system performing the speech emotion recognition for audio interviews in accordance with embodiments of the current invention. In one embodiment, apparatus/device 600 has a set of instructions causing the device to perform any one or more methods for speech emotion recognition used for interview questions. In another embodiment, the device operates as a standalone device or may be connected through a network to other devices. Apparatus 600 in the form of computer system includes one or more processors 601, a main memory 602, a static memory unit 603, which communicates with other component through a bus 611. Network interface 612 connects apparatus 600 to network 620. Apparatus 600 further includes user interfaces and I/O component 613, controller 531, driver unit 632, and signal and/or sensor unit 633. Diver unit 632 includes a machine-readable medium on which stored one or more sets of instructions and data structures, such as software embodying or utilize by one or more methods for the speech emotion recognition function. The software may also reside entirely or partially within the main memory 602, the one or more processor 601 during execution. In one embodiment, the one or more processor 601 is configured to select a first question from a question repository based on one or more selection criteria; obtain a sentiment classifier of an audio clip of a first answer to the first question, wherein the sentiment classifier is derived from an emotion classifier resulting from a convolutional neural network (CNN) model analysis of the audio clip; obtain an assessment result to the first question by analyzing the audio clip of the first answer to the first question using a recurrent neural network (RNN) model; and generate a first emotion response result to the first question based on the sentiment classifier and the assessment result, wherein the first emotion response result presents a sampling experience factor to the response assessment result. In one embodiment, software components running the one or more processors 601 run on different network-connected devices and communicate with each other via predefined network messages. In another embodiment, the functions can be implemented in software, firmware, hardware, or any combinations.

In one novel aspect, speech emotion and sentiment classifiers are obtained based on the answer audio clip. The emotion and sentiment classifiers are correlated to the assessment result of the answer audio clip, which provides an objective assessment to the correctness of the answer. The emotion and/or sentiment classifiers modifies the assessment results for both the answers to the technical questions and personal trait questions. The emotion and/or sentiment classifiers are further used to suggest the follow up technical and personal trait questions.

Figure 7:
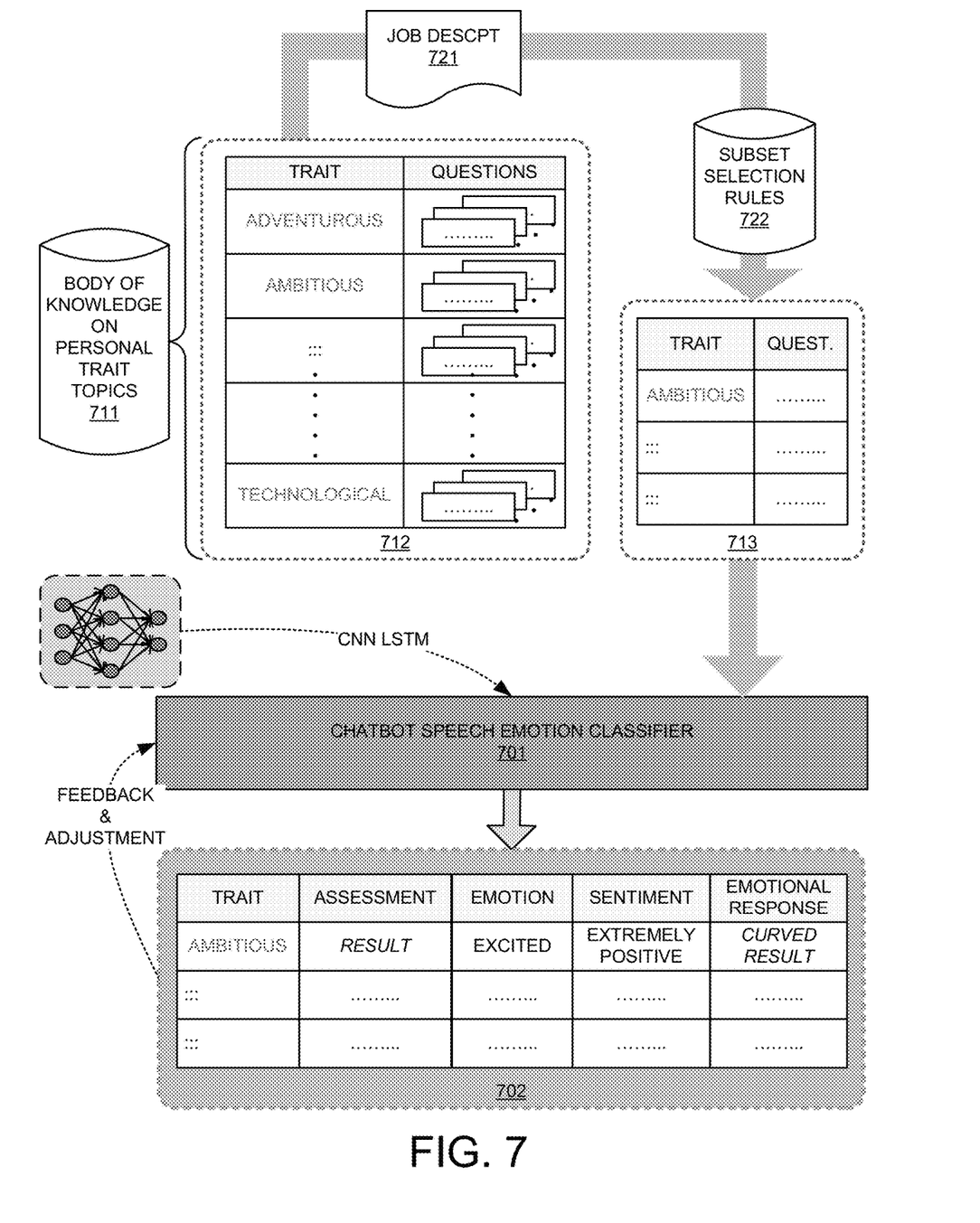
FIG. 7 illustrates exemplary diagrams for generating speech emotion responses for personal trait questions in accordance with embodiments of the current invention.

FIG. 7 illustrates exemplary diagrams for generating speech emotion responses for personal trait questions in accordance with embodiments of the current invention. Body of knowledge on personal trait topics 711 includes a whole set of personal traits. A body of knowledge question 712 includes the full list of personal traits; each has one or more questions related to the corresponding personal trait. In one embodiment, personal trait questions are a pre-designed and fabricated set of scenario-based questions that are related to the trait in question. These questions are "operational definitions" of the personal trait. A concept or a personal trait is designed/questioned with an example. Each personal trait in question bank has an operational definition. An example of a list of personal traits and its operational definitions, sourced by monster.ca, is listed here. In other embodiments, other personal traits and operational definitions list are used.

| | |
|---|---|
| Adventurous | I take risks. |
| Ambitious | I am driven to succeed. |
| Approachable | I work well with others. |
| Articulate | I can express myself well in front of groups. |
| Autonomous | I use initiative. |
| Calm | I stay levelheaded in a crisis. |
| Charismatic | I can be a leader when need be. |
| Cheerful | I develop a positive work environment. |
| Clever | I can juggle multiple tasks. |
| Competitive | I thrive under pressure. |
| Confident | I am not afraid to ask questions. |
| Cooperative | I get along well in a team setting. |
| Courteous | I care about workplace atmosphere. |
| Creative | I think outside the box. |
| Curiosity | I am eager to learn. |
| Determined | I am self-motivated. |
| Devoted | I am committed to the company's success. |
| Diligent | I always work my hardest. |
| Easygoing | I easily adapt to new situations. |
| Educated | I possess formal training. |
| Efficient | I have very quick turnover time. |
| Eloquent | I have strong communication skills. |
| Energetic | I am able to work long and hard hours. |
| Enthusiastic | I put my all into every project. |
| Flexible | I am able to adapt my priorities. |
| Focused | I am goal-oriented. |
| Friendly | I am easy to work with. |
| Honest | I value integrity. |
| Imaginative | I am inventive in my work process. |
| Independent | I need little direction. |
| Inexperienced | I am a blank pallet. |
| Inquisitive | I am excellent at gathering information. |
| Insightful | I can read between the lines. |

-continued

| | |
|---|---|
| Intuitive | I can sense when there is a problem. |
| Meticulous | I pay attention to the small details. |
| Neurotic | I am a perfectionist. |
| Open-minded | I take constructive criticism well. |
| Opinionated | I am comfortable voicing opinions. |
| Organized | I am a meticulous planner. |
| Patient | I am not easily ruffled. |
| Perceptive | I can read people effortlessly. |
| Persuasive | I am a natural salesperson. |
| Procedural | I work best with structure. |
| Punctual | I have great time management skills. |
| Quiet | I am a great listener. |
| Relaxed | I do not stress easily. |
| Resourceful | I use every tool at hand. |
| Responsible | I always finish a task on time. |
| Talkative | I am comfortable initiating a dialogue. |
| Technological | I am industrially savvy |

BOK on personal trait topics 711 generates and updates one or more interview questions based on the personal trait and its corresponding operational definition. In one embodiment, BOK on personal trait topics 711 keeps multiple whole sets of personal traits. In another embodiment, BOK on personal trait topics 711 updates the whole set of personal traits based on one more preconfigured triggering conditions, such as receiving user input updates. In one embodiment, a subset of personal trait 713 is selected based on job description 721 and/or subset selection rules 722. In another embodiment, a person trait-job requirement mapping is performed for selecting the subset of trait 713 based on the job requirement 721. In one embodiment, a DNN based model training and design are used to select relevant/desired subset of personal traits for a job description. In one embodiment, all questions related to a selected personal trait are included in subset 713. In another embodiment, a subset of questions is selected for each trait based on a question selection rule. Upon selecting the personal traits and corresponding questions, speech chatbot speech-emotion classifier 701 receives answer audio clips to each question. An emotion classifier and/or a sentiment classifier is generated for each answer received. In one embodiment, 1D CNN LSTM or 2D CNN LSTM is used to model and train the emotion classifier, which is mapped to the sentiment classifier. In one embodiment, the response table 702 includes the assessment results based on the contents of the answer, emotion classifier, sentiment classier, and the resulting emotion response result based on both the assessment result and the sentiment classifier. The sentiment classifier and/or the emotion classifier generates a curved result based on the assessment result. The emotion classifier and/or the sentiment classifier may curve the assessment result up or down. For example, when the emotion classifier is excited and mapped to the sentiment classifier being extremely positive, the assessment result is enhanced, reflecting in the curved result. In other scenarios, the assessment result may be weakened based on the sentiment classifier and/or the emotion classifier.

In one embodiment, the sentiment classifier and/or emotion classifier is used to generate adaptive selection of follow up questions. In another embodiment, the adaptive selection is based on the emotion response result, which a combination of the assessment result and the sentiment classifier. In one novel aspect, the emotion value is available for the computer interview system. Question selection and/or speech chatbot setting is a machined automated humanized selection based on the sentiment classifier and/or the emotion classifier. For example, if a candidate answers an easy question incorrectly while the emotion is sad, frustrated mapped to a negative sentiment classifier, the speech chatbot setting is adjusted to be humanized to ask the question in a more encouraging manner.

Figure 8:
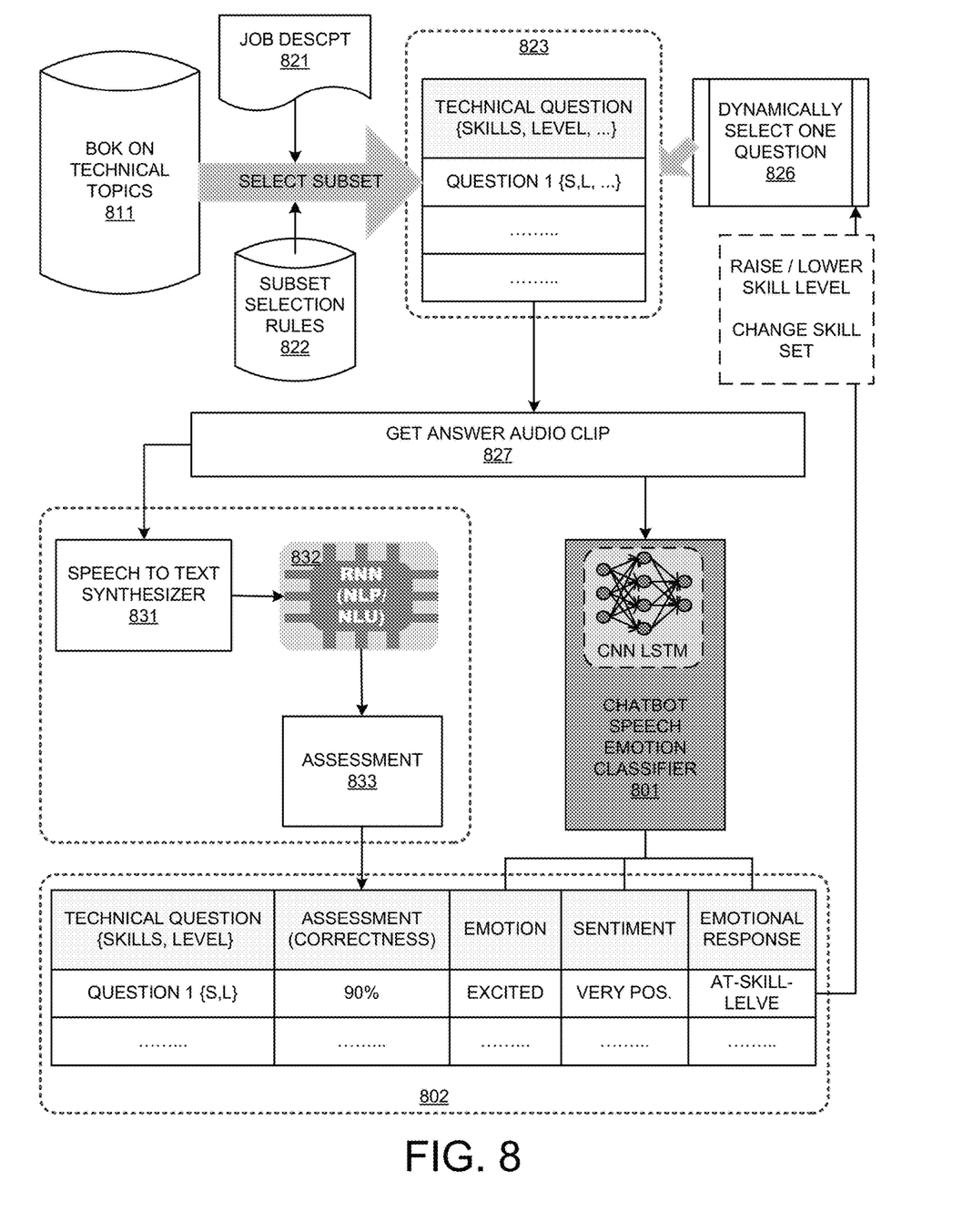
FIG. 8 illustrates exemplary diagrams for generating speech emotion responses for technical questions in accordance with embodiments of the current invention.

FIG. 8 illustrates exemplary diagrams for generating speech emotion responses for technical questions in accordance with embodiments of the current invention. A BOK on technical topics 811 includes a whole set of technical questions. In one embodiment, each question is associated with one or more attributes, such as related skills and level. A subset of technical questions is selected based on job description 821 and/or subset selection rules 822. At step 826, a question is selected from the selected subset 823. At step 827, an answer audio clip is obtained. At step 831, speech to text synthesizing is performed, which converts the answer audio clip to text. At step 832, RNN (NLP/NLU) is performed to evaluate the answer to the question. At step 833, the assessment result based on the contents of the answer is generated. The answer audio clip is also analyzed by the speech chatbot speech emotion classifier 801. In one embodiment, CNN LSTM model is used to get the emotion classifier of answer audio clip. The emotion classifier is mapped to the sentiment classifier based on predefined mapping rules. An exemplary table 802 illustrates emotion response results for technical questions. The assessment result evaluates the correctness of the answer. In one embodiment, the emotion classifier and/or the sentiment classifier identifies whether the candidate is positive, neutral, negative, or surprised with the question. In one embodiment, the sentiment classifier indicates whether the question is received at-skill level, below-skill level, or above-skill level. For example, the answer audio clip for question-1 is assessed having an assessment result of being 90% correct. The emotion classifier is generated as being excited. The sentiment classifier indicates "very positive". The emotion response result may indicate the question is an "at-skill" level question. The sentiment classifier and/or emotion classifier provides additional information for the answers to the technical skills. For example, if the candidate answers a good percentage of "at-skill-level" or "below-skill-level" questions wrong, it may show that the assessment result is underrated. The mistakes of answers may be caused by nervousness or other factors. In another example, if the candidate answers a good percentage of "above-skill-level" questions correctly, it may indicate a strong learning skill and a solid foundation in the field. In one embodiment, the combination of the assessment result and the sentiment/emotion classifier are analyzed by the computer system.

In one embodiment, the adaptive selection of the technical question is performed based on the sentiment classifier and/or the emotion classifier. The selecting of question procedure is further based on the feedback from the emotion response result. Questions with higher or lower skill level is selected based on the feedback to the learning model. Questions relating to a different set of skills may be selected based on the feedback.

Figure 9:
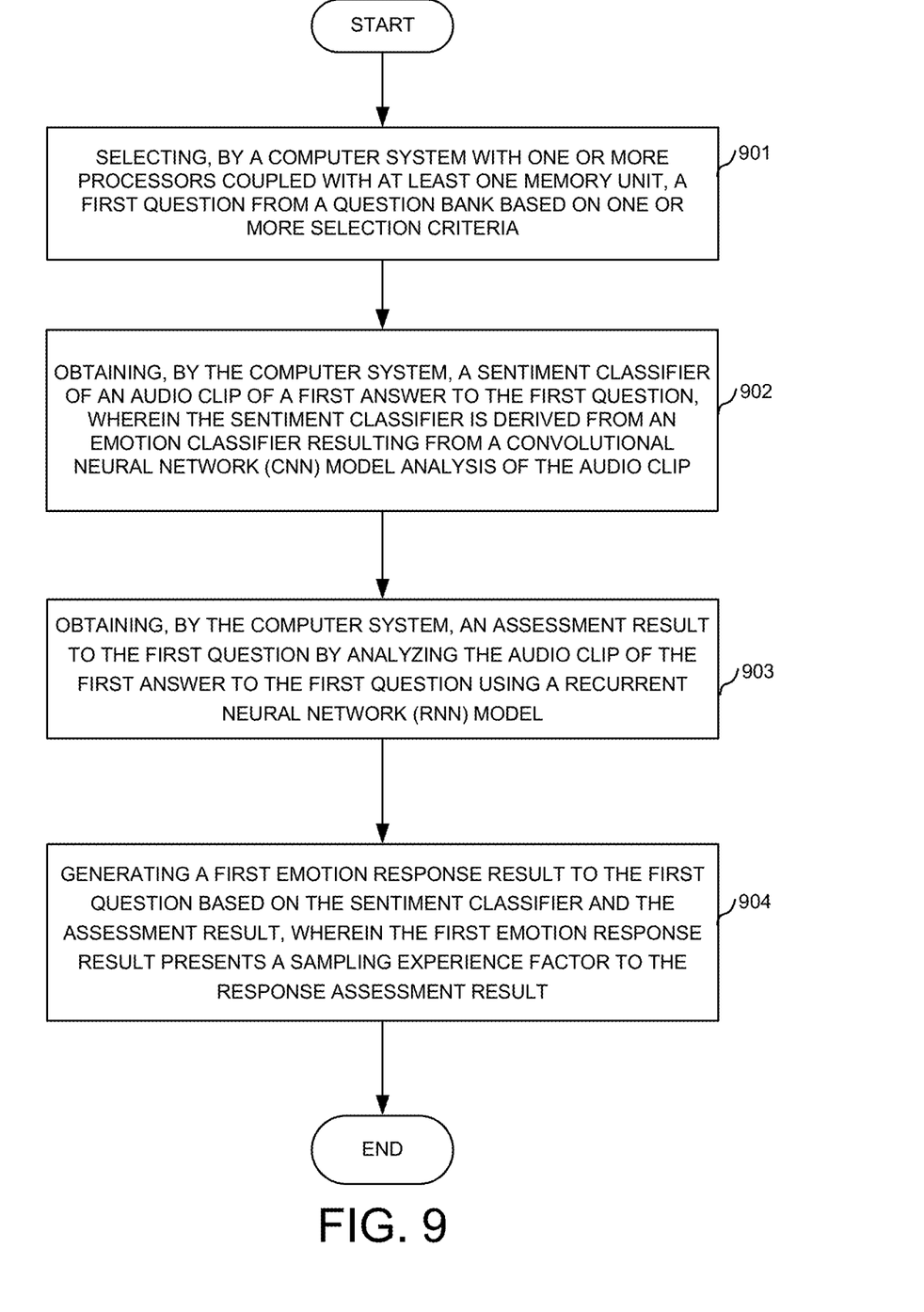
FIG. 9 illustrates an exemplary flow chart for speech emotion recognition for interview process in accordance with embodiments of the current invention.

FIG. 9 illustrates an exemplary flow chart for speech emotion recognition for the interview process in accordance with embodiments of the current invention. At step 901, the computer system selects a first question from a question bank based on one or more selection criteria. At step 902, the computer system obtains a sentiment classifier of an audio clip of a first answer to the first question, wherein the sentiment classifier is derived from an emotion classifier resulting from a convolutional neural network (CNN) model analysis of the audio clip. At step 903, the computer system obtains an assessment result to the first question by analyzing the audio clip of the first answer to the first question using a recurrent neural network (RNN) model. At step 904, the computer system generates a first emotion response result to the first question based on the sentiment classifier and the assessment result, wherein the first emotion response result presents a sampling experience factor to the response assessment result.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed:

1. A method, comprising:
   selecting, by a computer system with one or more processors coupled with at least one memory unit, a first question from a question bank based on one or more selection criteria;
   obtaining, by the computer system, a sentiment classifier of an audio clip of a first answer to the first question, wherein the sentiment classifier is derived from an emotion classifier resulting from a convolutional neural network (CNN) model analysis of the audio clip;
   obtaining, by the computer system, an assessment result to the first question by analyzing the audio clip of the first answer to the first question using a recurrent neural network (RNN) model; and
   generating a first emotion response result to the first question based on the sentiment classifier and the assessment result, wherein the first emotion response result presents a sampling experience factor to the assessment result.

2. The method of claim 1, wherein the emotion classifier is one selecting from an emotion group comprising angry emotion, excited emotion, frustrated emotion, happy emotion, neutral emotion, sad emotion, and surprised emotion, and the sentiment classifier is one selecting from a sentiment group comprising extremely positive, positive, neutral, negative, extremely negative, and surprised.

3. The method of claim 2, wherein the sentiment classifier is mapped to the emotional classifier.

4. The method of claim 1, wherein the first question is a personal trait question, wherein the first answer to the personal trait question identifies one or more personal traits.

5. The method of claim 4, wherein the assessment result of the personal trait question reveals a positive or a negative propensity on a scaling basis to the one or more personal traits identified by the first question.

6. The method of claim 5, wherein the sentiment classifier alters the assessment result when the sentiment classifier indicates a positive, an extremely positive, a negative or an extremely negative result.

7. The method of claim 1, wherein the first question is a technical question, wherein the first answer to technical question identifies one or more technical skills on a scaling basis.

8. The method of claim 7, wherein the sentiment classifier serves as a reference factor to the assessment result, wherein the assessment result for the first question is correct when the sentiment classifier indicates an extremely negative, a negative or a neutral result, the first emotion response result for the first question indicates the first question is a below-skill-level question.

9. The method of claim 1, further comprising: selecting a second question from the question bank, wherein a selection criterion is based on the first emotion response result.

10. The method of claim 1, further comprising: presenting the first question with a speech chatbot.

11. The method of claim 10, wherein a voice of the speech chatbot is adjustable based on one or more dynamically configured adjustment factors.

12. The method of claim 11, further comprising selecting a second question from the question bank, wherein one adjustment factor is the first emotion response result.

13. An apparatus comprising:
a network interface that connects the apparatus to a communication network;
a memory; and
one or more processors coupled to one or more memory units, the one or more processors configured to
select a first question from a question bank based on one or more selection criteria;
obtain a sentiment classifier of an audio clip of a first answer to the first question, wherein the sentiment classifier is derived from an emotion classifier resulting from a convolutional neural network (CNN) model analysis of the audio clip;
obtain an assessment result to the first question by analyzing the audio clip of the first answer to the first question using a recurrent neural network (RNN) model; and
generate a first emotion response result to the first question based on the sentiment classifier and the assessment result, wherein the first emotion response result presents a sampling experience factor to the response assessment result.

14. The apparatus of claim 13, wherein the emotion classifier is one selecting from an emotion group comprising angry emotion, excited emotion, frustrated emotion, happy emotion, neutral emotion, sad emotion, and surprised emotion, and the sentiment classifier is mapped to corresponding emotion classifier and is one selecting from a sentiment group comprising extremely positive, positive, neutral, negative, extremely negative, and surprised.

15. The apparatus of claim 13, wherein the first question is a personal trait question, wherein the first answer to the personal trait question identifies one or more personal traits and reveals a positive or a negative propensity on a scaling basis to the one or more personal traits identified by the first question.

16. The apparatus of claim 15, wherein the sentiment classifier alters the assessment result when the sentiment classifier indicates a positive, an extremely positive, a negative or an extremely negative result.

17. The apparatus of claim 13, wherein the first question is a technical question, wherein the first answer to technical question identifies one or more technical skills on a scaling basis.

18. The apparatus of claim 13, wherein the one or more processors are further configured to select a second question from the question bank, wherein a selection criterion is based on the first emotion response result.

19. The apparatus of claim 13, wherein the one or more processors are further configured to present the first question with a speech chatbot, and wherein a voice of the speech chatbot is adjustable based on one or more dynamically configured adjustment factors.

20. The apparatus of claim 19, wherein the one or more processors are further configured to select a second question from the question bank, wherein one adjustment factor is the first emotion response result.

* * * * *